United States Patent
Chiel et al.

(10) Patent No.: US 8,245,799 B2
(45) Date of Patent: Aug. 21, 2012

(54) APPARATUS AND METHOD FOR LOCOMOTION

(75) Inventors: Hillel Judah Chiel, University Heights, OH (US); Roger D. Quinn, Akron, OH (US); Alexander Boxerbaum, Cleveland, OH (US)

(73) Assignee: Case Western Reserve University, Cleveland, OH (US)

(*) Notice: Subject to any disclaimer, the term of this patent is extended or adjusted under 35 U.S.C. 154(b) by 257 days.

(21) Appl. No.: 12/761,154

(22) Filed: Apr. 15, 2010

(65) Prior Publication Data
US 2010/0287928 A1    Nov. 18, 2010

Related U.S. Application Data

(60) Provisional application No. 61/169,581, filed on Apr. 15, 2009.

(51) Int. Cl.
*B25J 11/00*    (2006.01)
(52) U.S. Cl. .............................. 180/7.1; 901/1
(58) Field of Classification Search .............. 180/7.1, 180/8.5
See application file for complete search history.

(56) References Cited

U.S. PATENT DOCUMENTS

| 5,788,002 A * | 8/1998 | Richter | 180/8.5 |
| 7,617,891 B2 * | 11/2009 | Chan et al. | 180/7.1 |

OTHER PUBLICATIONS

Kim, Sangbae, et al., "Micro artificial muscle fiber using NiTi spring for soft robotics", The 2009 IEEE/RSJ International Conference on Intelligent Robots and System, Oct. 11-15, 2009, St. Louis, USA, pp. 2228-2234.

* cited by examiner

*Primary Examiner* — Tony Winner
(74) *Attorney, Agent, or Firm* — Tarolli, Sundheim, Covell & Tummino LLP

(57) ABSTRACT

An apparatus for locomotion includes an elongate body member defining a longitudinal axis and having oppositely disposed first and second body ends separated by a body lumen. A power source is operative to selectively provide motive power to the apparatus by changing a lateral cross-sectional area of the body member in at least one actuation location to produce at least one peristaltic wave propagated through the body member substantially along the longitudinal axis. The peristaltic wave is a substantially smooth wave. The peristaltic wave causes the body member to interact with an ambient environment and provide longitudinally oriented locomotion to the apparatus. A method for locomotion is also described.

31 Claims, 12 Drawing Sheets

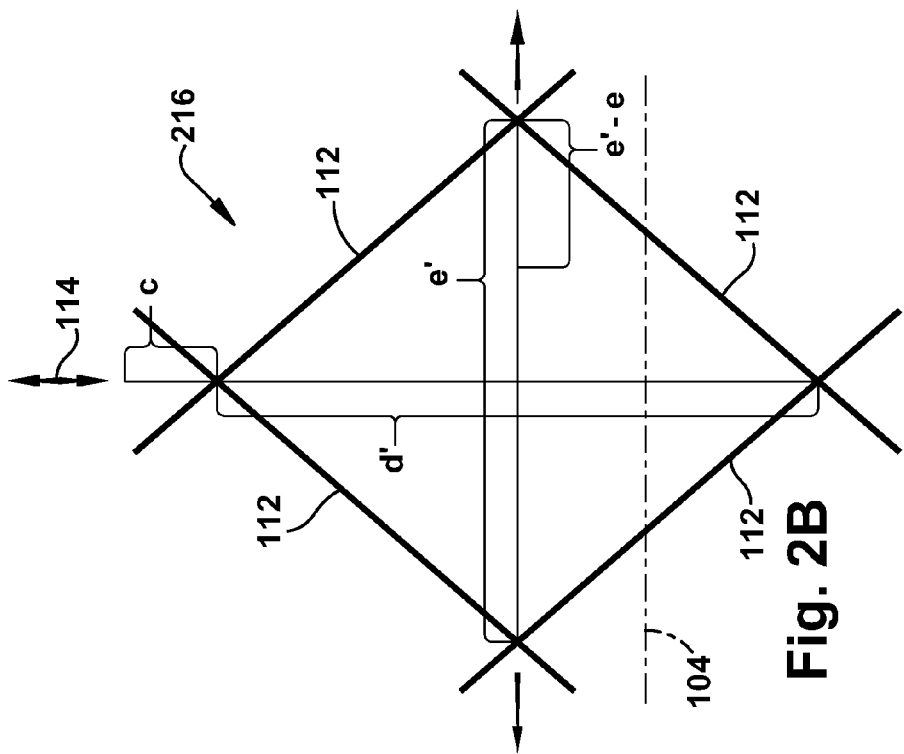
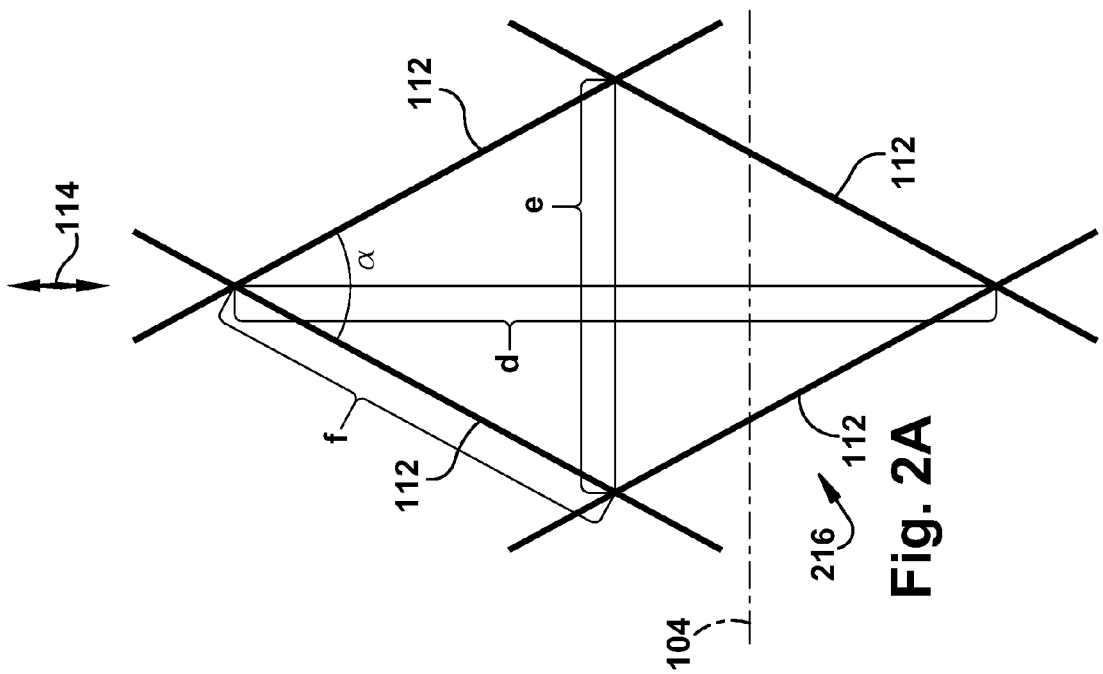

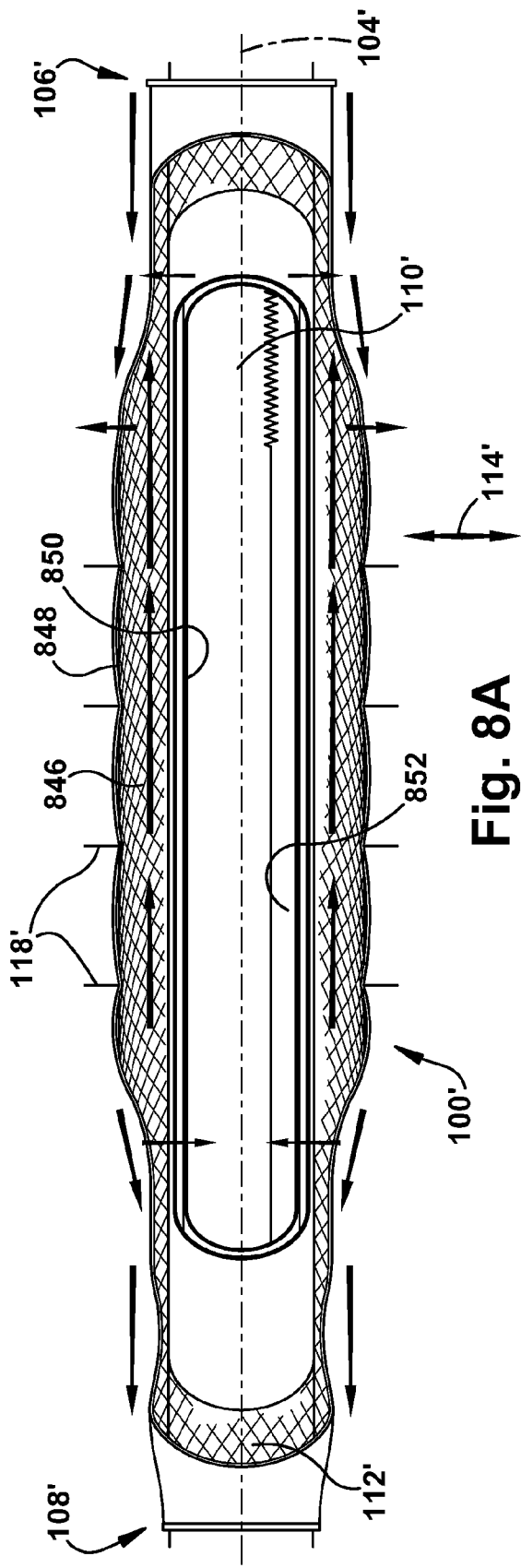

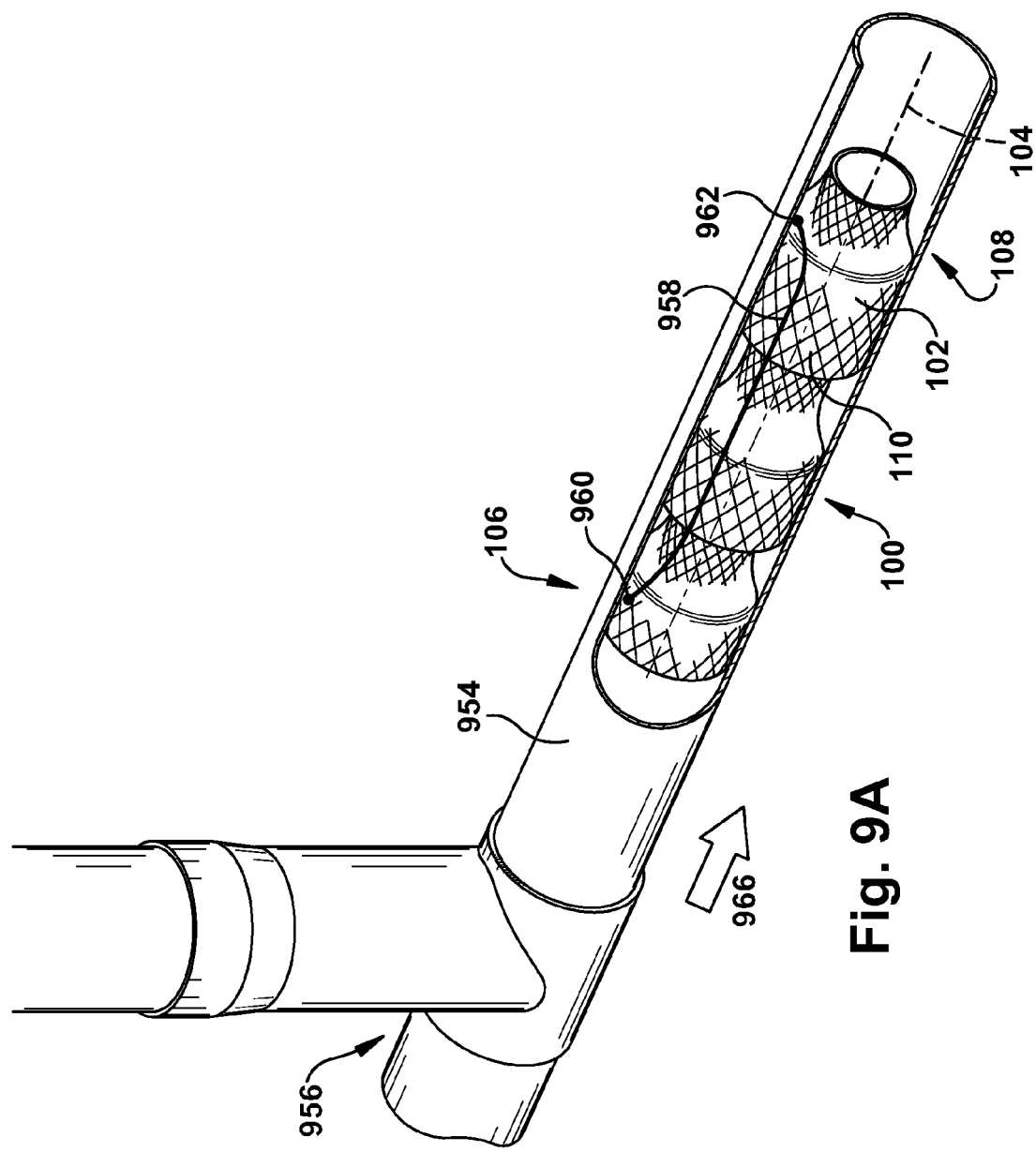

APPARATUS AND METHOD FOR LOCOMOTION

RELATED APPLICATION

This application claims priority from U.S. Provisional Application No. 61/169,581, filed 15 Apr. 2009, the subject matter of which is incorporated herein by reference.

TECHNICAL FIELD

The present invention relates to an apparatus and method of locomotion and, more particularly, to a method and apparatus for producing locomotion in a tight, constrained, and/or curving use environment.

BACKGROUND OF THE INVENTION

Soft-bodied invertebrates, such as leeches, worms, and slugs, have successfully colonized marine, terrestrial, and fossorial (underground) environments. They do so with complex structures that can rapidly change shape on command. Some of these animals contain a central fluid-filled cavity. Contraction of a muscle component of the cavity induces an expansion of other parts of the cavity and of its surrounding muscle. Animals with these body architectures have a hydrostatic skeleton. However, other soft structures, such as tongues, trunks, or tentacles, have higher power-to-mass ratios. These structures consist solely of muscle fibers with no central fluid-filled cavity and have been termed muscular hydrostats. By deploying muscle groups arranged in ordered configurations—longitudinally, circumferentially, or helically—these structures are capable of both rapid and dexterous movements. The skins of soft-bodied animals have many sensors embedded within them. Their nervous systems coordinate their many degrees of freedom in order to locomote in a variety of ways, including peristaltic crawling, anchor-and-extend, and swimming.

It is often desirable to remotely access the interior of structures, which are difficult or unsafe for a human to directly enter, possibly because of constrained and/or labyrinthine physical conditions. For example, inspections or repairs may be required by pipelines and plumbing systems of all types, search and rescue missions may need to look for disaster victims within collapsed buildings, or scientists may wish to explore an underwater cave system. In addition, there may be applications in the medical field for robots, which can travel through the human body, such as through the vasculature or the digestive system, to observe and manipulate the patient's internal structure less invasively than currently available methods for medical procedures such as endoscopy or angioplasty.

Robots with locomotion capabilities similar to those of soft-bodied animals would be able to complete many useful tasks, including conducting reconnaissance through small crevices, exploring complex terrain for search and rescue missions, actively pushing an endoscope throughout the entire gastrointestinal (GI) tract, or performing minimally invasive surgery. Currently, remote-controlled robots are in limited use for such applications, but the propulsion systems and other technical aspects of these robots are not well-suited for widespread use. For example, serpentine robots have had the most success in some of these areas to date, but rely on a motion that does not work as well in the most confined spaces where burrowing is required.

SUMMARY OF THE INVENTION

In an embodiment of the present invention, an apparatus for locomotion is described. An elongate body member defines a longitudinal axis and has oppositely disposed first and second body ends separated by a body lumen. A power source is operative to selectively provide motive power to the apparatus by changing a lateral cross-sectional area of the body member in at least one actuation location to produce at least one peristaltic wave propagated through the body member substantially along the longitudinal axis. The peristaltic wave is a substantially smooth wave. The peristaltic wave causes the body member to interact with an ambient environment and provide longitudinally oriented locomotion to the apparatus.

In an embodiment of the present invention, an apparatus for locomotion is described. An elongate body member defines a longitudinal axis and has oppositely disposed first and second body ends separated by a body lumen. The body member is made of a material with anisotropic strain properties and has a plurality of longitudinally spaced actuating members associated therewith. Each actuating member extends about at least a portion of the body member within a lateral plane substantially perpendicular to the longitudinal axis. A power source is operative to selectively provide motive power to the apparatus by changing the lateral dimensions of the plurality of actuating members in a predetermined sequence to produce at least one peristaltic wave propagated through the body member substantially along the longitudinal axis. The body member is constructed to provide inversely proportional relationships between lateral contraction and longitudinal expansion and between longitudinal contraction and lateral expansion. The peristaltic wave causes the body member to interact with an ambient environment and provide longitudinally oriented locomotion to the apparatus.

In an embodiment of the present invention, a method of locomotion is described. An apparatus including an elongate body member defining a longitudinal axis and having oppositely disposed first and second body ends separated by a body lumen is provided. Motive power is selectively provided to the apparatus by changing a lateral cross-sectional area of the body member in at least one actuation location. At least one peristaltic wave propagated through the body member substantially along the longitudinal axis is produced, the peristaltic wave being a substantially smooth wave. The body member is caused to interact with an ambient environment and provide longitudinally oriented locomotion to the apparatus.

BRIEF DESCRIPTION OF THE DRAWINGS

For a better understanding of the invention, reference may be made to the accompanying drawings, in which:

FIGS. 2A-2B are partial schematic side views of the embodiment of FIG. 1A;

FIG. 8A is a partial sectional schematic side view of an embodiment of the present invention;

FIGS. 9A and 9B depict the embodiment of either of FIGS. 1A and 8A in a second use environment.

DESCRIPTION OF EMBODIMENTS

Figure 1A:
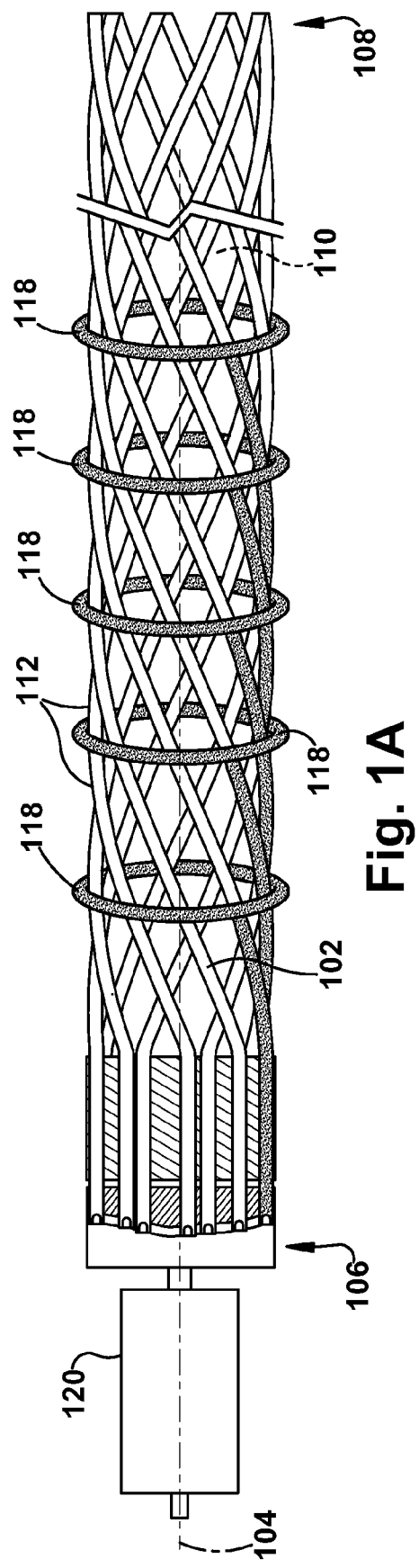
FIG. 1A is a schematic side view of an embodiment of the present invention.

In accordance with the present invention, FIG. 1 depicts a first embodiment of an apparatus 100 for locomotion. The apparatus 100 includes an elongate body member 102 defining a longitudinal axis 104 and having oppositely disposed first and second body ends 106 and 108, respectively, separated by a body lumen 110. The longitudinal axis 104 will be used herein to discuss a longitudinal direction with respect to the body member 102, with a lateral direction being substantially perpendicular to the longitudinal axis 104.

The body member 102 may be made of a material with anisotropic strain properties. For example, and as shown in the Figures, the body member 102 could at least partially be made of a mesh formed from a plurality of fibers 112. (Throughout this description, when a plurality of elements are shown in a Figure, only a few of those elements may be explicitly numbered, for ease of understanding the Figures, though one of ordinary skill in the art will understand which unnumbered elements implicitly share the number of the labeled element[s].) Alternately, and not shown, the body member 102 could be a solid- or pierced-walled tube, at least partially made from a single sheet of material. Like all structures and components of the apparatus 100, the body member 102 could have any suitable dimensions. For example, the body member 102 could have a cross-sectional profile that is round, curvilinear, rectangular, cruciform, or any other suitable shape or combination of shapes.

The body member 102 will be described herein as being a cylindrical structure formed of a mesh. The mesh could be a braided mesh, a non-braided mesh including a plurality of overlapping fibers attached together at mutual intersections, or could have any other suitable structure. An example of a non-braided mesh could be a pair of helical fibers having opposite handed winds (i.e., one winding clockwise and the other winding counterclockwise), with the helical fibers being connected together in either a rigid or pivoting/floating manner at mutual intersections to form the mesh making up the body member 102. The individual fibers of either a braided or a non-braided mesh themselves may have anisotropic bending properties in the longitudinal and lateral directions in order to facilitate operation of the apparatus 100 in a desired manner.

The body member 102 may be constructed to provide inversely proportional relationships between lateral contraction and longitudinal expansion and between longitudinal contraction and lateral expansion. FIGS. 1B-1E depict various configurations of the apparatus 100 under different external forces to illustrate these inversely proportional relationships. The views of FIGS. 1B-1E are substantially shown as being in the same scale as each other, with no such representations made with respect to any of the other Figures included herein.

Figure 1E:
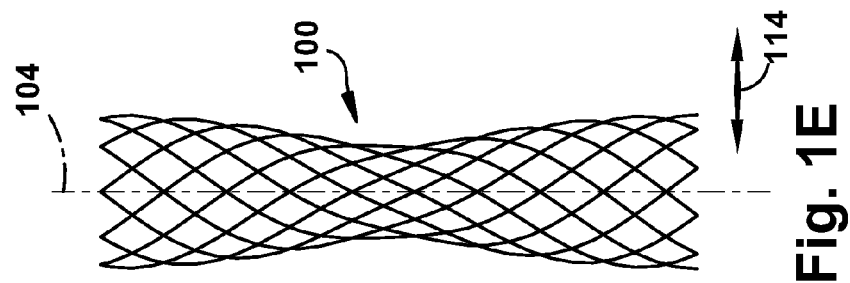
FIGS. 1B-1E are side views illustrating different configuration options of the embodiment of FIG. 1A.
Figure 1D:
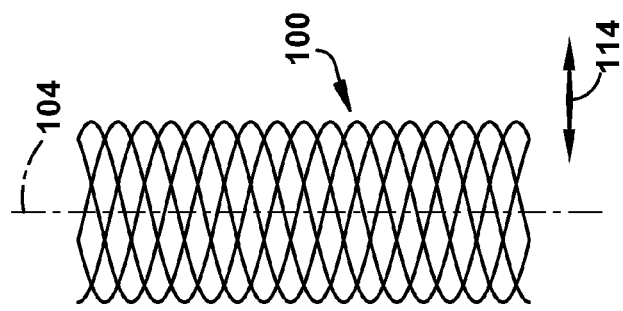
Figure 1C:
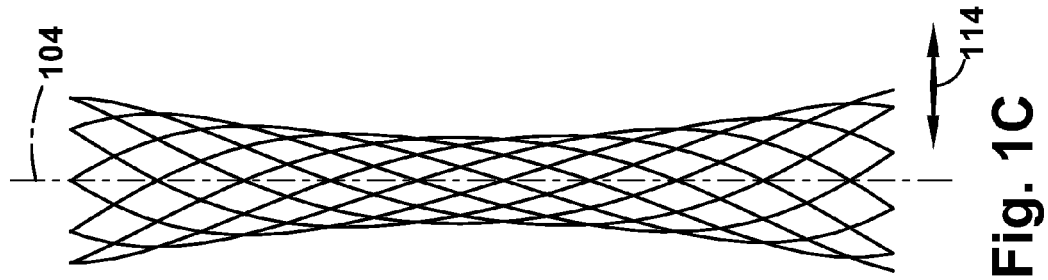
Figure 1B:
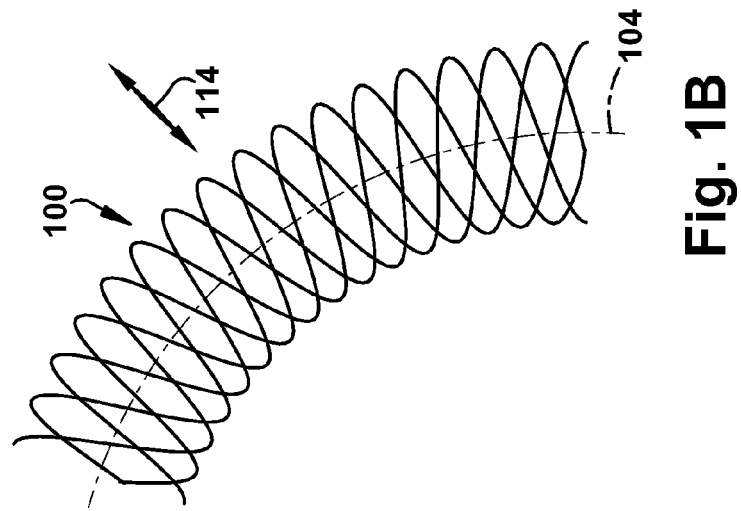

FIG. 1B shows the apparatus 100 being held in a curved arrangement, but with a substantially relaxed resting-state configuration in which both the longitudinal height and the lateral width (shown by lateral arrow 114 for an example location along the longitudinal axis 104) of the apparatus arise from the natural characteristics of the body member 102 structure, rather than from externally imposed forces (the curving force notwithstanding in this Figure). FIG. 1C shows the apparatus 100 in a longitudinally stretched configuration, and it can be seen that the apparatus is smaller in the lateral direction 114 than the apparatus shown in FIG. 1B. FIG. 1D shows the apparatus 100 in a longitudinally compressed configuration, with the attendant increased lateral width from the apparatus shown in FIG. 1C. FIG. 1E shows the apparatus 100 with a reduced-width portion imposed by a laterally-extending cincture, which results in a slight increase in height along the longitudinal axis 104 from the relaxed configuration of the apparatus in FIG. 1B.

The mechanism behind the laterally/longitudinally proportional behaviour of the apparatus 100 shown in FIGS. 1B-1E is shown in more detail for a single cell 216 of mesh, such as a braided or non-braided mesh forming the body member 102, in FIGS. 2A-2B. A single cell 216 of the mesh can be used to derive the anisotropic strain properties of the body member 102. The dimension c shown in FIGS. 2A-2B is the input to the sequence and represents a change in lateral width of the cell 216 under a laterally oriented force, as will be further discussed below.

The mechanical strain that occurs with the simple braided mesh described above can be directly calculated from the geometry of four crossing fibers 112, as shown in FIGS. 2A-2B. The below calculation presumes rigidity in the fibers 112, to generalize the cell 216 of FIGS. 2A-2B as a four-bar mechanism. The scale of the mesh is not important for this derivation, as the calculations only describe the anisotropic properties of a continuous ideal material. Between the views shown in FIG. 2A and FIG. 2B, a lateral force is exerted along d, reducing its length to d'. The dimension along e will expand by an amount that is a function of the initial shape of the diagonal cell 216, defined here by the angle α. From the Pythagorean theorem and the law of sines, we have:

$$d'^2 + e'^2 = (2*f)^2 \rightarrow e' = \sqrt{(2*f)^2 - d'^2}$$

$$\frac{f}{\sin(\pi/2)} = \frac{d}{\sin(\pi/2 - \alpha/2)} \rightarrow f = \frac{d}{2*\cos(\alpha/2)}$$

The change in length along d is due to the lateral displacement, c:

$$d' = (d-c)$$

The above equations can be combined to find the new axial length e':

$$e' = \sqrt{\left(\frac{d}{\cos(\alpha/2)}\right)^2 - (d-c)^2}$$

Lastly, for the purposes of this analysis, the strain of the fiber 112 material is defined as:

$$\varepsilon = \frac{e' - e}{e},$$

where $$e = d*\tan(\alpha/2)$$

Combining the previous threes equations provides an equation for the axial strain of the braided mesh as a function of the input lateral displacement c and the geometry of the mesh defined by d and a $$\varepsilon = \frac{\sqrt{\left(\frac{d}{\cos(\alpha/2)}\right)^2 - (d-c)^2} - d*\tan(\alpha/2)}{d*\tan(\alpha/2)}$$

Accordingly, the forces upon a single cell 216 of mesh can be calculated and extrapolated to model the dynamics of the body member 102 as a whole. The body member 102 dynamics are of interest in discussion of the apparatus 100 because of the manner in which the apparatus 100 achieves locomotion. Namely, the apparatus 100 is manipulated to produce a peristaltic wave which causes the body member 102 to interact with an ambient environment and provide longitudinally oriented locomotion to the apparatus. Herein, it will be presumed that a series of peristaltic waves are created to prompt locomotion of the apparatus 100 for as long as desired.

Returning to FIG. 1A, the structure used to produce the peristaltic wave will now be described. The apparatus 100 shown in FIG. 1A includes a body member 102 made from a braided mesh of fibers 112. At least one actuating member 118 is associated with the body member 102, with each actuating member being located at an actuation location. When, as here, a plurality of actuating members 118 are provided, the actuating members (and thus the respective actuation locations) are longitudinally spaced along the body member 102. The actuating members 118 will be discussed herein, for brevity, as "extending about" at least a portion of the body member 102 within a lateral plane substantially perpendicular to the longitudinal axis 104. However, one of ordinary skill in the art will recognize that the actuating members 118 could be located outside and/or inside the structure of the body member 102, and the term "extending about" should be interpreted herein as indicating any relationship between the actuating members and the body member which is operative to produce the described motion of the body member. For example, the actuating member(s) 118 need not extend completely about the body member 102, but could, instead, extend partially about the body member 102.

A power source 120, shown in block form in FIG. 1A, is operative to selectively provide motive power to the apparatus 100 by changing a lateral cross-sectional area of the body member 102 in at least one actuation location to produce at least one peristaltic wave propagated through the body member substantially along the longitudinal axis 104. When a plurality of longitudinally-spaced actuation locations are provided, the power source 120 may be operative to selectively provide motive power to the apparatus 100 by changing the lateral cross-sectional area of the body member 102 at the plurality of longitudinally-spaced actuation locations to produce the peristaltic wave.

The power source 120 may be any suitable power source, which is configured to change the lateral cross-section of the body member 102, and may be chosen based upon the nature of the actuating member(s) 118. For example, if an actuating member 118 is a tether or cincture (e.g., a string, cable, or other elongate, flexible structure) extending around the body member 102, the power source 120 may be a motor connected to the actuating member and configured to loosen or tighten the actuating member 118 within the lateral plane in a lasso-like manner as desired. As another example, if an actuating member 118 is made of a shape memory alloy ("SMA"), the power source 120 may be a thermal or electrical source operative to selectively expand or contract the actuating member 118 within the lateral plane as desired. (e.g., the actuating member 118 could be a cincture made of a tightly coiled helical SMA wire, which at least partially coils to a decreased diameter upon the application of electrical and/or heat energy.) As yet another example, an actuating member 118 could be a cincture made of a tubular material and configured to expand and/or contract by the application of pneumatic or hydraulic fluid to the interior of the tubular material. As a further example, the actuating member 118 could include at least a portion of a concentric cable, such as the type of cable commonly used for bicycle brakes, wherein a relatively stationary outer sheath surrounds a longitudinally movable, substantially rigid inner cable, and the inner cable could be manipulated to expand or contract the actuating member about the body member 102.

It is contemplated that the body member 102 may be at least partially formed by an active mesh, wherein the active mesh includes an actuation component operative to actuate at least one of the actuating members 118. For example, when the actuating member 118 includes a SMA, the active mesh could include electrical wires operative to transfer actuating electrical energy to the SMA. As another example, when the actuating member 118 includes a concentric cable, the active mesh could be at least partially formed of concentric cables operatively connected to the actuating member to transfer remotely applied tension or compression force to the inner cable of the actuating member and thereby expand or contract the actuating member.

It is also contemplated that the power source 120 could include a collective power provider, the collective power provider being operatively connected to, providing motive power to, and changing the lateral dimensions of a plurality of actuating members 118. When present, the collective power provider may be longitudinally spaced from at least one of the plurality of actuating members 118 to remotely control and/or power expansion and/or contraction of that actuating member. A manifold (not shown) may be provided to assist a collective power provider in controlling and/or powering the expansion and/or contraction of a plurality of actuating members simultaneously or sequentially, as desired to produce the peristaltic wave.

The power source 120 could alternatively or additionally include at least one individual power provider (not shown), with each individual power provider being operatively connected to, providing motive power to, and changing the lateral dimensions of a chosen one of the plurality of actuating members 118. When present, the individual power provider(s) could each be co-located with a respective actuating member 118 at or near an actuation location, and is optionally integrally formed as a single piece with a respective actuating member. For example, a small hydraulic cylinder or electric motor (not shown) could form at least a portion of a cincture-type actuating member 118 extending about the body member 102, wherein expansion and/or contraction of the hydraulic cylinder or a motor-driven piston (not shown) manipulates a remaining portion of the actuating member 118 to extend about a larger or smaller lateral cross-sectional area of the body member.

The actuating member(s) 118 may operate in any desired manner to change the cross-sectional area of the body member 102 at the actuation location(s). When the body member 102 is at a laterally expanded state in a resting configuration, at least one actuating member 118 may selectively laterally contract the body member under motive power from the power source 120. When the body member 102 is at a laterally contracted state in a resting configuration, at least one actuating member 118 may selectively laterally expand the body member under motive power from the power source 120. When the body member 102 is in a state between laterally contracted and laterally expanded (such as in the configuration shown in FIG. 1B), the at least one actuating member 118 may both selectively laterally expand and selectively laterally contract the body member under motive power from the power source 120.

When, as shown in FIG. 1A, a plurality of longitudinally spaced actuating members 118 are provided, the power source 120 changes the lateral cross-sectional area of the body member 102 to produce the peristaltic wave by changing the lateral dimensions of the actuating members in a predetermined sequence, regardless of the manner in which the lateral cross-sectional area of the body member is changed. No matter how many actuating members 118 are provided, however, the apparatus 100 may be configured to produce at least one peristaltic wave propagated longitudinally through the body member 102, and the material and construction of the apparatus may be chosen to ensure that the peristaltic wave is a substantially smooth wave, which may be sinusoidal. For example, the flexibility of a mesh material forming the body member 102 may be important in producing such a wave, as a suitably flexible mesh will allow multiple waves to propagate longitudinally through the body member 102 in series, while a more rigid mesh material will cause large portions of, or even the entire length of, the body member 102 to expand or contract in unison due to the expansion or contraction of an actuating member 118. In other words, the mesh, when present, or another suitable material may serve to smooth out the individual actions of the actuating members 118 by passively interpolating the desired shape of the peristaltic wave traveling along the body member 102 longitudinally between adjacent actuating members.

This substantially smooth peristaltic wave produced by the apparatus 100 of the present invention is in contrast to the "peristaltic" action of prior art devices (not shown), wherein a wave cycle may comprise three actuators and even substantially rigid body member sections, with the resulting contour of the wave produced by these prior art devices being more akin to a square wave interrupted by regions of the body that do not laterally expand or contract located between the actuators. These prior art devices often undesirably interact with (e.g., "catch" upon) nearby obstacles and surfaces due to the square nature of their waves, thus impeding locomotion. In contrast, the apparatus 100 of the present invention produces smooth peristaltic waves of any desired length, which propagate in the opposite longitudinal direction of the locomotion of the apparatus and tend to push off any obstacles or surfaces encountered by the apparatus in a way that enhances locomotion. In less constrained environments (i.e., those with fewer nearby obstacles or surfaces to contact), the apparatus 100 will still move forward with minimal frictional losses to the environment, due to the natural "stepping" motion induced by the smooth peristaltic waves.

Peristaltic locomotion has several interesting, counter-intuitive properties. The waves of expansion and contraction flow in the opposite direction of the apparatus 100 travel, as a direct result of the anisotropic strain properties of the body member 102. When a portion of the body member 102 leaves the ground and is laterally contracted through action of the power source 120, a new ground contact point forms directly behind that "picked up" portion. The laterally contracting portion of the body member 102 will expand longitudinally forward and/or backward, but that longitudinal expansion is constrained on the rear side of the locomotive travel direction by the new ground contact point, so the laterally contracting portion must move forward. Nonetheless, while the portions of the body member 102 leaving ground contact are contracting laterally, and accelerating forward due to their longitudinal expansion, the portions of the body member 102 making ground contact are decelerating at the same rate (even if the peristaltic wave is asymmetric, the net accelerations and decelerations over the length of the wave must cancel out). Therefore, on flat ground, an apparatus 100 with a whole number of peristaltic waves traveling at a constant speed will have no need for friction forces in order to maintain a constant velocity. In this way, the motion is analogous to a wheel (not shown) rolling on flat ground: points along the circumference are accelerating, but the wheel rolls at a constant velocity and requires no external forces. This means that peristaltic motion has the possibility of being very efficient, and may not be as constrained by the need for good ground friction as previously thought.

A model has been previously developed to examine the kinematic scaling of earthworm locomotion, and this model may be used to predict the speed of a device utilizing peristaltic motion. This model describes the speed of the device as:

$$\text{Speed} = \frac{\text{Stride Length}}{\text{Cycle Time}}$$

Figure 3:
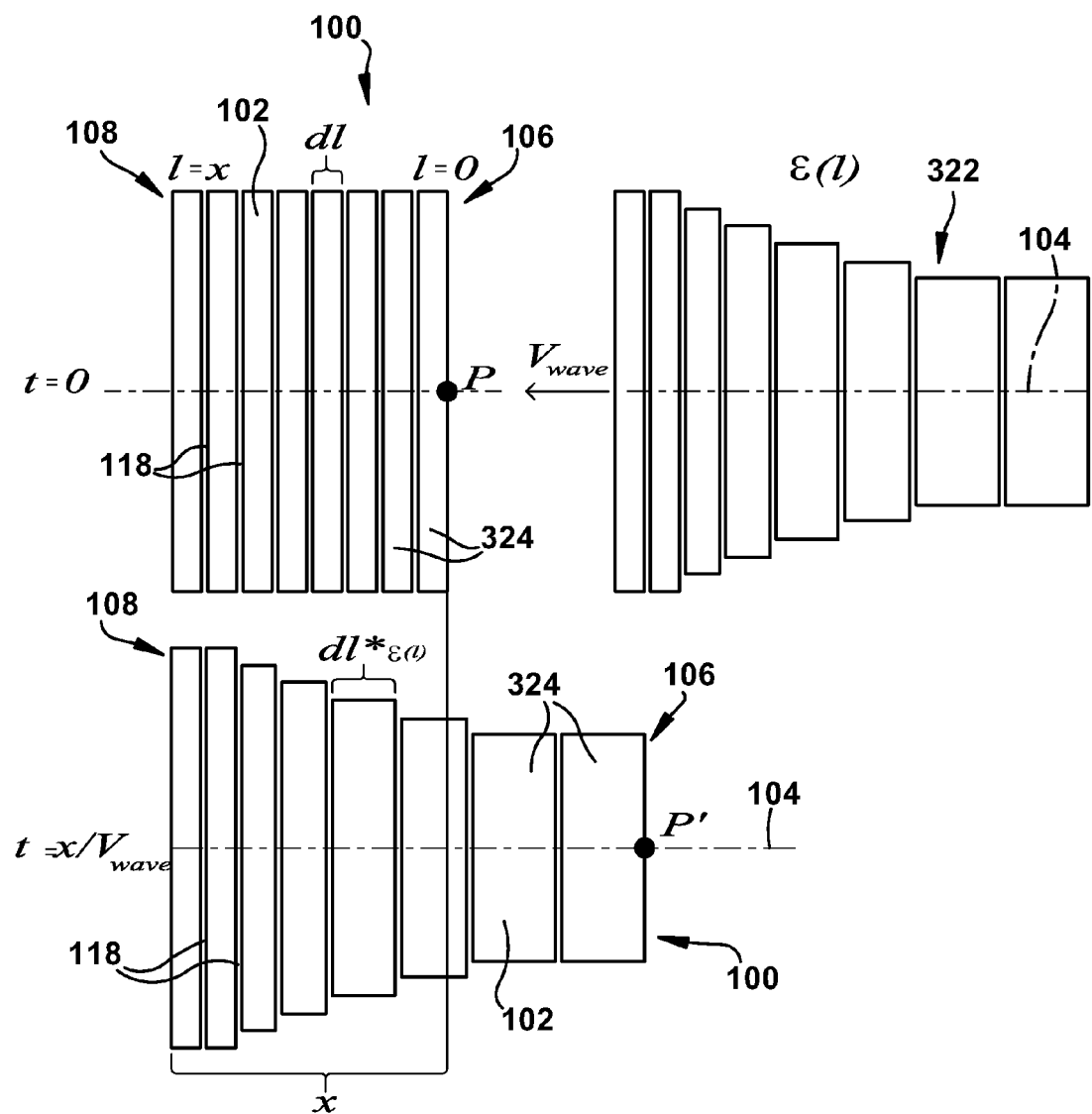
FIG. 3 is a schematic side view illustrating the interaction of a waveform with the embodiment of FIG. 1A.

While this observational model accurately characterizes earthworm locomotion on flat ground, it does not capture or explain the causes of slippage, and therefore tends to overestimate the speed of artificial devices. To address this problem, a new analytical model of peristaltic motion has been developed to deal with continuously deformable structures, such as the disclosed apparatus 100. First, the kinematics of an ideal continuous anisotropic material are found, as in the above discussion regarding FIGS. 2A and 2B, and then equations are derived for the apparatus 100 position as a function of the peristaltic wave propagating therethrough. If the speed of the peristaltic wave is known, the position and velocity of the apparatus 100 can be found as a function of time, using the new position of a point P as the peristaltic wave propagates through the body member 102, as shown in FIG. 3. The displacement of that point P can be found by integrating the strain function.

FIG. 3 depicts a schematic representation of an apparatus 100 encountering and absorbing (for propagation) a peristaltic wave (shown schematically at 322), with particular reference to the longitudinal position of a point P at the first body end 106 of the body member 102. The initial displacement of point P from its original position is at first merely a result of the axial lengthening or "strain" of the portion 324 of the body member 102 caused by the peristaltic wave 322, which is moving longitudinally toward the apparatus 100 in the upper portion (t=0) of FIG. 3. (A portion 324 is defined as a region of the body member 102 located longitudinally between directly adjoining actuating members 118.) However, in the next moment, the displacement of point P will also include the axial strain of the next portion 324 encountering the peristaltic wave. Therefore, the total displacement of the first element can be described as the integral of the strain as a function of length, l:

$$P'_{(x)} = \int_{l=0}^{l=x} \varepsilon(l) dl$$

If the peristaltic wave 322 as a whole has a constant velocity (traveling toward the left side of the page, in the orientation of FIG. 3), then the position of point P in global coordinates can be found as a function of time by replacing x with $t*V_{wave}$ and dl with $dt*V_{wave}$. Now, $$P_{(t)} = \int_0^T \varepsilon(t*V_{wave})dt * V_{wave}$$

Also, since the velocity of the point P is the time derivative of the immediately previous equation, $$V_{(t)} = \varepsilon(t*V_{wave}) * V_{wave}$$

These units are consistent because the output of the strain function is dimensionless. This last equation reveals that the speed of a point P on the apparatus 100, and, by extension, the speed of the entire apparatus 100, is a function of the shape of the peristaltic wave ε and the speed of this wave. Increasing the local deformation (anisotropic strain) or increasing the peristaltic wave 322 speed will make the apparatus 100 move with a higher velocity.

Since both position and velocity of a point P on the apparatus 100 are functions of the strain wave deformation previously defined, once a predetermined sequence and speed of energizing the actuating members 118 is prescribed, position and velocity can be calculated as a function of time.

Figure 4:
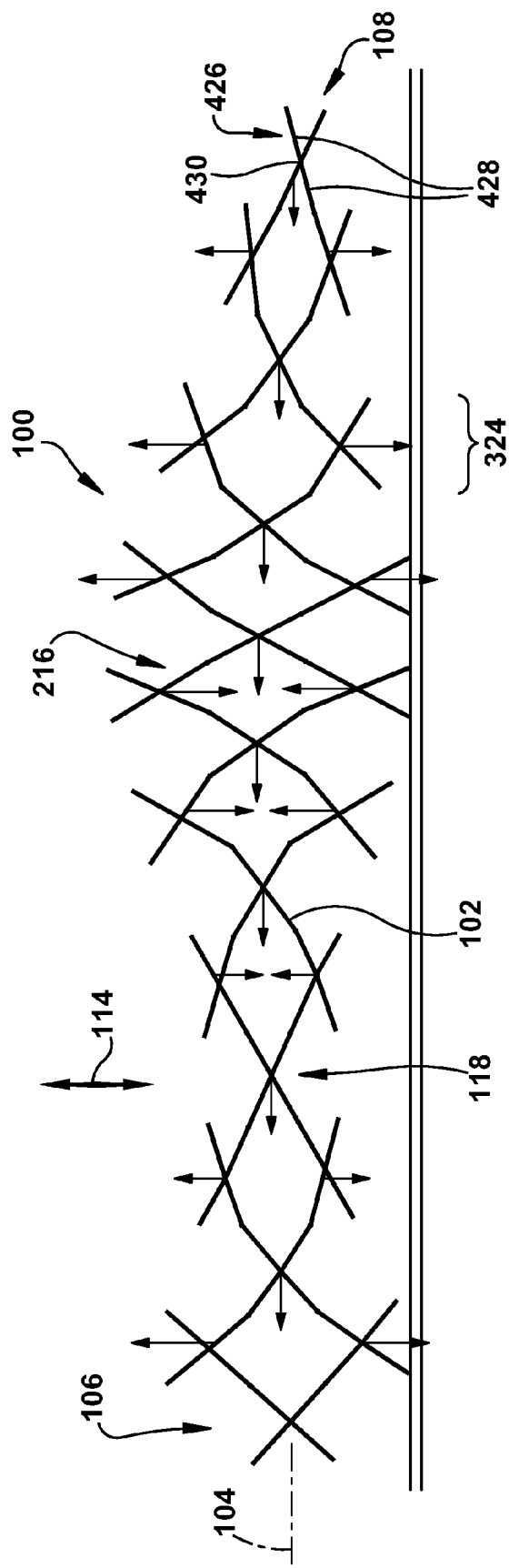
FIG. 4 is a schematic side view of a simulation of the embodiment of FIG. 1A.

A simple 2-D dynamic simulation of the apparatus 100, shown schematically in FIG. 4, was created to evaluate this method of locomotion, and to capture the discrete nature of individual cells 216 of the body member 102. Each cell 216 consists of a modified four-bar mechanism, as shown in schematic view FIGS. 2A-2B, where each bar 426 is modeled as being split into two pieces 428 joined by a torsional spring 430. This approximates the ability of the cells 216 of the body member 102 to bend, a desirable capability for wave formation. There are ten actuating members 118 shown in FIG. 4, each driven by an identical periodic function derived from a cam mechanism (omitted in FIG. 4) to be discussed later. The laterally oriented arrows in FIG. 4 indicate expanding or contracting (depending upon the outward and inward arrow directions, respectively) actuating members 118. The longitudinally oriented arrows in FIG. 4 indicate a resultant locomotive motion of the apparatus 100. One of the advantages of producing the simulation of FIG. 4 is easy access to a large amount of data, including the positions, velocities, and accelerations of points on the apparatus 100, including its center of mass.

Because the simulation shown in FIG. 4 does not have a substantially continuous body member 102 like the apparatus 100 of FIG. 1A, the ground contact transitions shown in FIG. 4 are typically not smooth. Therefore, even with ten actuating members 118, the simulation of FIG. 4 may appear similar to the previously discussed prior art devices having discrete, defined segments. Some considerations with modeling such as that used to create the simulation of FIG. 4 will now be discussed in a comparison of this simulative model to the calculated approach previously used to model the apparatus 100 behaviour.

An interesting effect was observed during the swing-stance transitions in the simulation of the apparatus 100 shown in FIG. 4 that might account for some of the challenges of building an apparatus 100 like that in the simulation. When the ground contact point switches from one portion 324 to the next, the second portion 324 is likely to contact the ground before it has fully laterally expanded. Therefore, after ground contact, the second portion 324 will continue to contract laterally, instead of expanding. This means that the peristaltic wave 322 gets unnaturally stretched due to too many constraints, and at least one of the ground contact points is likely to slip.

Furthermore, because the new ground contact point may not be firmly established soon enough, the portion 324 that is leaving the ground loses the forward progress it would have made at the beginning of the swing phase. The calculated model (above) indicates that the acceleration of the portion 324 would be greatest during this lost swing time, so the loss of locomotive speed may be significant. While the most strain is achieved with small start angles, the forces required to move are high, due to the low mechanical advantage. Because the mesh forming the body portion 102 may be relatively soft and flexible, this can be impractical. The area of the body portion 102 in substantially direct contact with the actuating members 118 may not transfer the actuating member forces to the immediately adjacent area(s) of the body portion before buckling. It may therefore be desirable to provide the body portion 102 with the smallest initial angle possible that does not induce buckling.

Despite the discontinuous nature of the simulated model shown in FIG. 4, the analytical model calculated above can account for these issues. For a given apparatus 100 design, the strain that is lost is typically the same over each peristaltic wave 322 cycle, and can therefore be incorporated into the strain function by the subtraction of a constant value, Q:

$$P_{(t)} = \int_0^T (\varepsilon(t*V_{wave}) - Q)dt * V_{wave}$$

The factor Q can be chosen such that the velocity of the portion 324 of the body member 102, which is proportional to the strain curve, dips below zero at the first ground contact, and comes back up at lift off. This is consistent with the observation that the strain that occurs after ground contact contributes to moving the apparatus 100 backwards rather than forwards. The area under the strain curve is also reduced substantially, thereby dramatically decreasing the displacement of the point on the apparatus 100. Even after the portion 324 has failed to fully utilize the strain at the beginning of the wave, it will lose again as the next portion 324 has the same problem, and so on.

Figure 5:
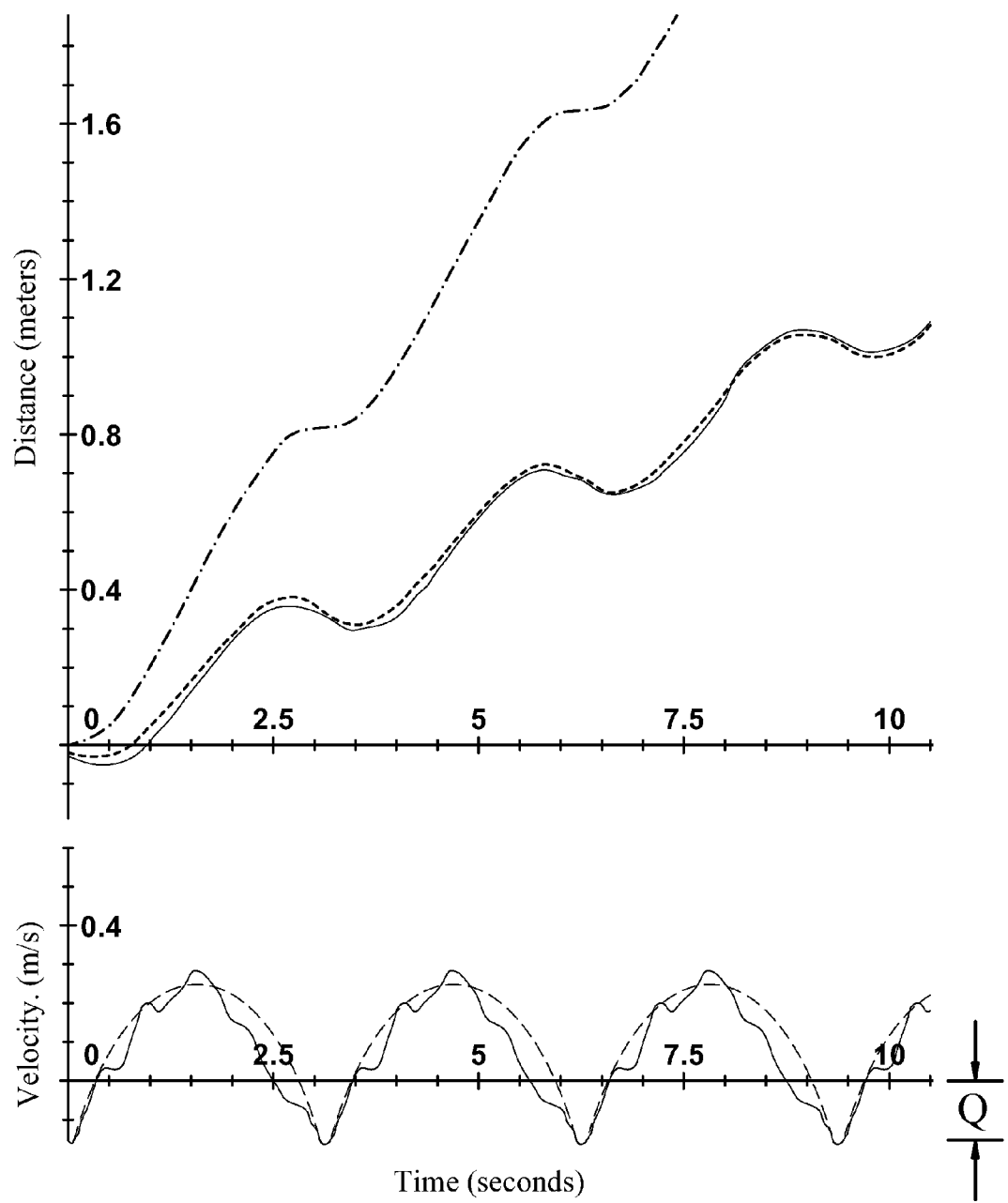
FIG. 5 is a chart depicting movement characteristics of the simulation of FIG. 4.

FIG. 5 shows the position and velocity of a point P on the simulated 2-D apparatus of FIG. 4 (shown in solid lines), compared to the analytical model calculated above (shown in dashed lines). FIG. 5 shows that the analytical model accurately predicts the position and velocity of a simulated apparatus 100 with semi-discrete actuators. The dash-dot line of FIG. 5 is the position predicted by the analytical model if the apparatus 100 has ideal swing-stance transitions and Q=0. This is the theoretical maximum speed of a robot with a perfect, continuously deformable mesh. This suggests that such a structure would have significant speed improvements over a discrete structure such as that modeled in the simulation of FIG. 4, even one having a large number of portions 322, such as the ten portions shown in FIG. 4.

The analytical model can provide many insights on its own. Adding more peristaltic waves 322 over the same length of apparatus 100 increases the number of ground contact points, and for this reason may create a more stable robot with better ground traction. However, more peristaltic waves 322 come at the expense of a shorter step length, and alone cannot speed up locomotion of the apparatus 100. Faster locomotive speeds can instead be achieved by building peristaltic waves 322 with higher strain rates, or by generating a faster peristaltic wave. The shape of the peristaltic wave 322 deformation of the apparatus 100 is limited by the need to have ground contact, and to keep the forward moving portions 324 from dragging on the ground. It may be desirable for the laterally expanding portions 324 to not contact the ground before they have fully expanded, and that laterally contracting portions do not leave the ground before ground contact is established behind them. This will ensure that the critical strain change right after lift-off is not lost and that the strain function remains positive at all times. These simple principles may help to focus efforts for improving this method of locomotion.

Figure 6:
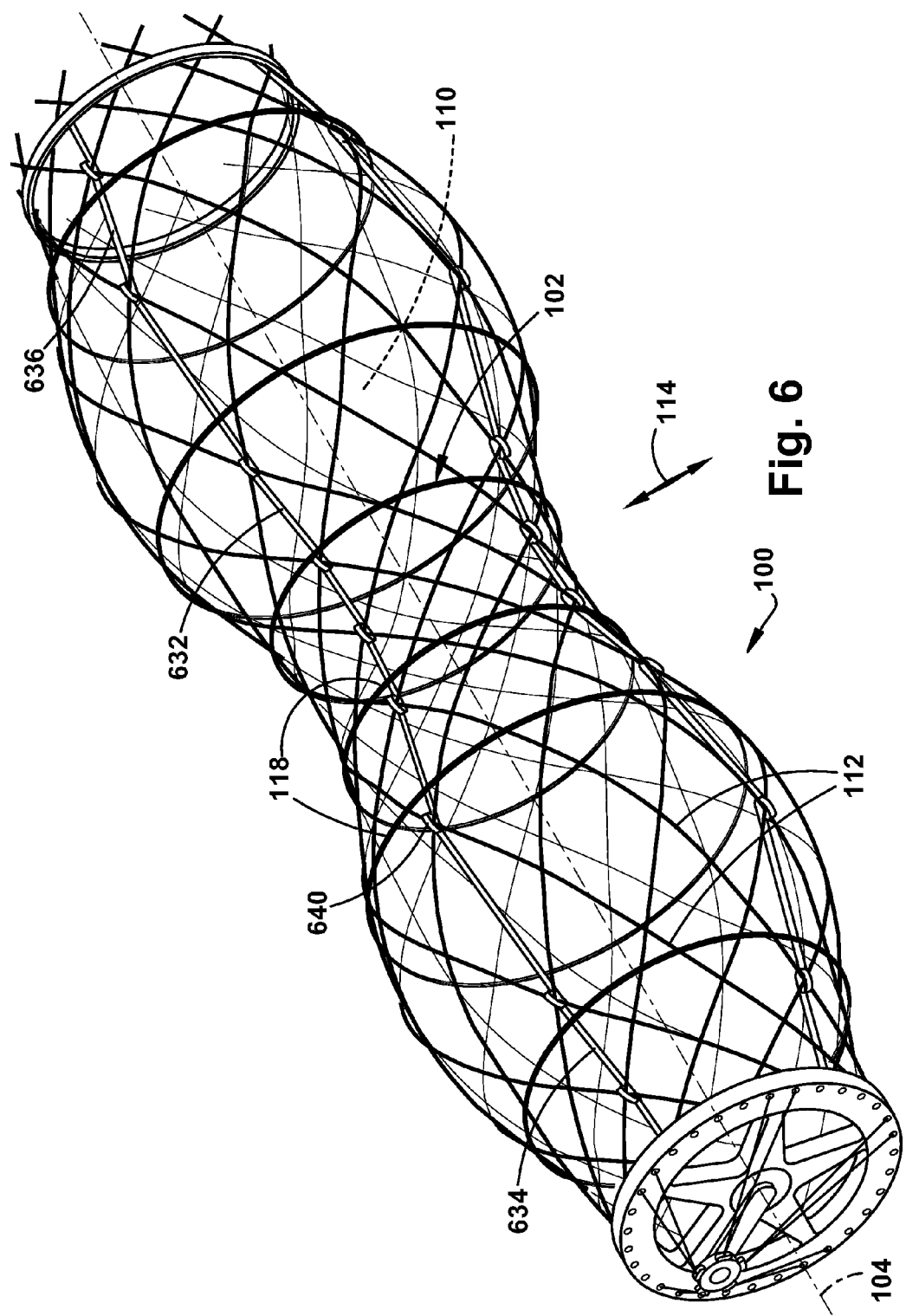
FIG. 6 is a side view of the embodiment of FIG. 1A.
Figure 7:
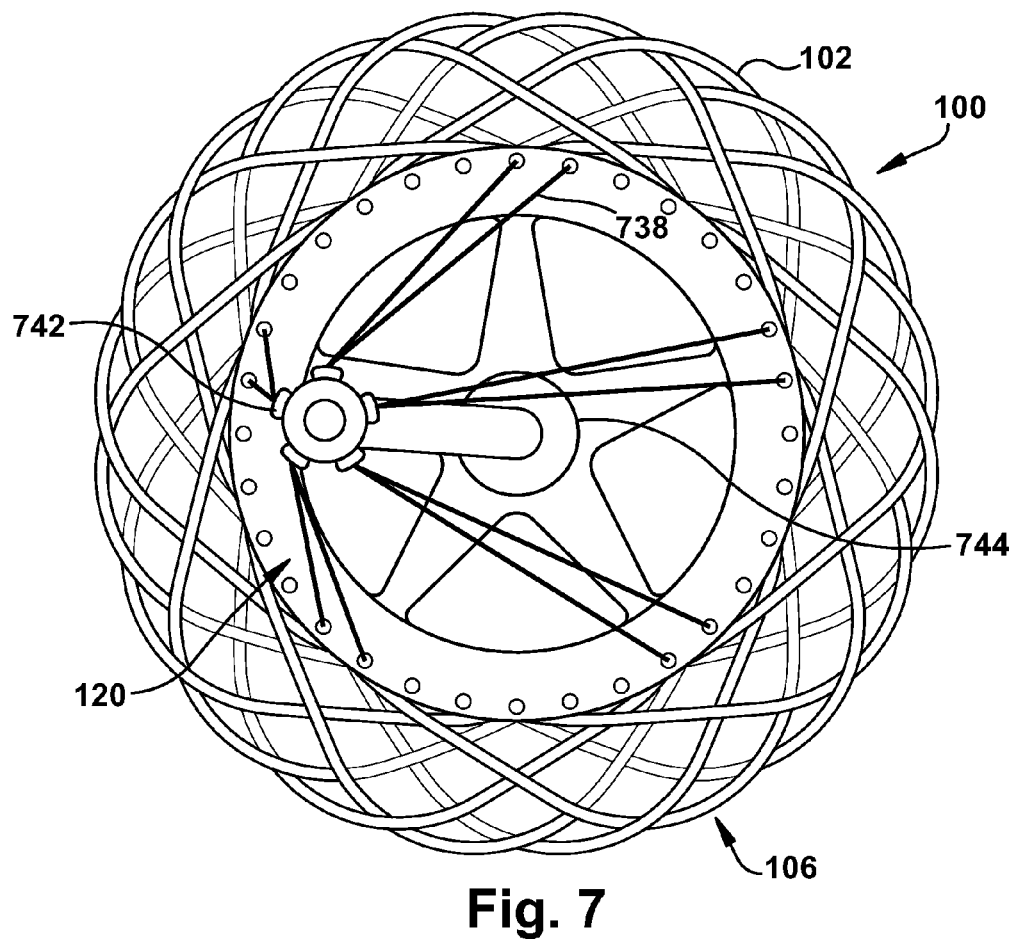
FIG. 7 is a front view of the embodiment of FIG. 6.

FIGS. 6-7 illustrate side and front views, respectively, of an apparatus 100 according to the embodiment of the present invention shown in FIG. 1A. In the apparatus 100 shown in FIGS. 6-7, the body member 102 may be at a laterally expanded, longitudinally contracted state in a resting configuration. For example, the longitudinal contraction may be at least partly provided to the body member 102 by at least one elastic member 632 extending longitudinally with respect to the body member, the elastic member having longitudinally spaced first and second elastic ends 634 and 636, respectively, with the first and second elastic ends both being connected to the body member. When connected to the body member 102 in this manner in a tension configuration, the elastic member 632 can urge the first and second body ends 106 and 108 closer together, thus contracting the body member 104 longitudinally and, because of the anisotropic strain properties of the material (here, a braided mesh) of which the body member is made, laterally expanding the body member. Accordingly, the actuating members 118 will contract to produce the peristaltic wave 322 for facilitating locomotion of the apparatus 100. In an alternate configuration (not shown), the apparatus 100 of FIGS. 6-7 could be in an at least partially longitudinally expanded state in a resting configuration, and the actuating members 118 will expand to at least partially produce the peristaltic wave 322. However, the below description will presume the former situation, in which the body member 102 is in the laterally expanded, longitudinally contracted state in the resting configuration.

The braided mesh that provides the anisotropic strain properties for the body member 102 of FIGS. 6 and 7 is an active mesh. This active mesh is at least partially made of concentric cable sheathing fibers 112, with interior cables 738 run through the bore of the sheathing fibers 112 and operatively connected to individual actuating members 118. At the actuation locations and at or near the actuating members 118, a routing mechanism (not shown) is provided to interrupt the concentric cable sheathing of the fibers 112 and operatively connect the interior cables 738 to the actuating members 118, such that tension applied to each interior cable 738, even at a remote location, will be transmitted mechanically as tension to the actuating member 118, thus contracting the actuating member 118 and reducing the cross-sectional area of the body member 102 at the associated actuation location. This routing mechanism also holds the sheathing fiber 112 that continues to form a portion of the braided active mesh for the remainder of the length of the apparatus 100, even after exited at the routing mechanism by the interior cable 738. Optionally, two interior cables 738 may run through a single sheathing fiber 112 and split at the routing mechanism, laterally encircling the body member 102 in opposite directions to meet on the side of the actuating member 118 laterally opposite the routing mechanism. This double-cable method, when present, doubles the stroke length of the actuating member 118 compared to a single interior cable 738 wrapped laterally around the entire body member. Small wire guides 640 may be attached along the actuating member 118 to maintain the actuating member in a relative position attached to the body member 102 when it is not being contracted.

At the first body end 106, as shown in FIG. 7, the interior cables 738, with each interior cable being associated with a single actuating member 118, are tensioned in a predetermined sequence by a power source 120 of the collective power provider type, including a cam 742 driven by a single drive motor 744. It is contemplated that the apparatus 100 may also or instead include individual power providers (not shown), located at and/or remote from at least one of the actuation locations, which may provide advantages in studying sensorimotor wave propagation and adaptive behavior. The cam 742 mechanism depicted in FIG. 7, however, creates a peristaltic wave 322 in a simple and repeatable mechanical manner. In this way, forward and backward locomotion can be controlled as a single degree of freedom using a single motor 744. In contrast, a plurality of individual power providers, when present, provide the apparatus 100 with a plurality of degrees of freedom (the number corresponding to the number of individual power providers), which may implicate a more complicated control scheme, but which may be helpful in providing a desired locomotive action to the apparatus 100.

The cam 742 mechanism is designed to tension the interior cables 738 in a predetermined sequence to produce a peristaltic wave 322 that is substantially smooth and, via the cam mechanism, sinusoidal in both time and space. The shape of the peristaltic wave 322 can be changed by changing the cam arm length. In the depicted configuration, two peristaltic waves 322 are present along the length of the apparatus 100 at all times. Closely paired interior cables 738, shown in FIG. 7, are each routed to one of two actuating members 118 longitudinally spaced by half the total length of the apparatus 100. Their proximity to each other on the perimeter of the cam 742 indicates that these two interior cables 738 will actuate their associated actuating members 118 to nearly identical amounts of compression at any given point in time, thus promoting parallel propagation of dual peristaltic waves 322 in sequence. In the configuration shown in FIGS. 6 and 7, ten actuators are longitudinally distributed along the apparatus. However, ten additional actuators could be easily added by utilizing the remaining empty brake cable sheathing fibers 112 to either further smooth the peristaltic wave 322 or to facilitate a longer apparatus 100.

In the apparatus 100 shown in FIGS. 6 and 7, steel cable was chosen for the interior cables 738 specifically for its strength and its natural pairing with the concentric cable sheathing fibers 112, which was designed to interface with such a steel cable, though the interior cables could also or instead be made of polyester, Kevlar, Spectra, or any other suitable material(s). The relatively large minimum bending radius of steel cable meant that special care had to be given to how the interior cables 738 were routed. The apparatus 100 of FIGS. 6 and 7 routes the interior cables 738 through the sheathing fibers 112 such that the minimum bending radius of the interior cables is never less than, for example, twelve millimeters, sufficient to accommodate any steel cable small enough to fit in the concentric cable sheathing fibers 112. However, one of ordinary skill in the art could readily provide an apparatus 100 including a concentric cable(s) arrangement similar to that shown having suitable dimensions for any desired application of the present invention.

The body member 102 shown in FIGS. 6 and 7 maintains its shape due at least partially to physical interactions provided by the braiding of the sheathing fibers 112. The elastic members 632 (acting here as a return spring to provide longitudinal compression to the body member 102) may also anchor the mesh together at points where the elastic members wrap around the mesh. The body member 102 may also or instead include small joints at each fiber intersection, actuation location, or any other desirable location to align the sheathing fibers 112 and/or the actuating members 118 and maintain the apparatus 100 components in desired conditions. Alternatively or additionally, the body member 102 may be at least partially surrounded by a flexible sheath, such as a soft polymer skin, to help preserve the alignment of the sheathing fibers 112, act as a return spring, protect at least a portion of the apparatus 100 from adverse ambient conditions, or for any other reason. Optionally, and as shown in FIGS. 6 and 7, the apparatus 100 may have an open construction configured to allow ambient fluid to flow through at least one of longitudinally through the body lumen 110 and laterally through the mesh comprising the body member 102 during locomotion of the apparatus.

FIG. 8 depicts an apparatus 100' according to a second embodiment of the present invention. The apparatus 100' of FIG. 8 is similar to the apparatus 100 of FIGS. 1-7 and therefore, structures of FIG. 8 that are the same as or similar to those described with reference to FIGS. 1-7 have the same reference numbers with the addition of a "prime" mark. Description of common elements and operation similar to those in the previously described first embodiment will not be repeated with respect to the second embodiment.

An apparatus 100' with a lateral width on the order of one centimeter may have applications in, for example, medicine, including examination of the entire gastrointestinal tract, as well as applications in search and rescue environments and military reconnaissance. SMAs are a good candidate for actuation at this small scale, though it should be noted that the second embodiment of FIG. 8 is by no means restricted to use with the SMA actuating members 118' or for the small-scale implementations used herein as an example.

Micro-helix SMAs (i.e., those previously described as relatively tightly wound helical wires) may have strain ratios of up to 200% and can be actuated in under one second. The helical SMA wires could extend about at least a portion of the body member 102' to act as actuating members 118' and could be actuated by wires or fibers 112' (which may themselves be at least partially comprised of SMA) that also comprise the braided or non-braided mesh of the body member.

In the apparatus 100' of the second embodiment, a laterally expanded configuration of the body member 102 may be provided by at least one of a compressible fluid and an incompressible fluid located inside the body member. The compressible or incompressible fluid may assist in propagating the longitudinally-oriented peristaltic wave 322' produced by energization of the actuating members 118'.

At the small scale of the embodiment shown in FIG. 8, it may be desirable to use a hydrostatic fluid to selectively laterally expand actuating members 118' which are in a contracted configuration in their resting state. In this second embodiment, as shown in FIG. 8, a bolus of incompressible fluid 846 moves longitudinally from the second body end 108' toward the first body end 106' between the outer skin 848 and an inner liner 850 of the apparatus 100', powered at least partially by the power source 120' providing the sequential lateral constriction of the actuating members 118'. As the fluid 846 is squeezed at the trailing edge of the peristaltic wave 322', the fluid causes lateral expansion of the outer skin 848 at the leading edge of the peristaltic wave 322' (i.e., toward the first body end 106'). The result is the generation of continuous peristaltic waves 322' propagating longitudinally through the body member 102 from the second body end 108' toward the first body end 106' (i.e., from left to right in the orientation of FIG. 8), causing the apparatus 100' to locomote in the opposite direction of the peristaltic wave 322' (i.e., from right to left in the orientation of FIG. 8).

Optionally, and particularly when an incompressible fluid 846 is used to provide the laterally expanded configuration, the body member 102' may include at least one longitudinally oriented counterflow tube 852 to allow the incompressible fluid to travel between the first and second body ends 106' and 108' in a direction opposite the direction in which the peristaltic wave 322' is propagated. Accordingly, as the peristaltic wave 322' carries the incompressible fluid 846 toward one of the first and second body ends 106' and 108', the fluid can return to the opposite end of the body portion 102' for use in propagating further peristaltic waves 322' instead of building up pressure at the leading end of the body member 102'.

An alternative method of actuation at the small scale used as an example environment for the second embodiment of FIG. 8 could dispense with the SMA actuation. Instead, the mesh forming the body portion 102' could be made of fibers 112' of hollow tubing which serve as hydraulic lines for individual micro-hydraulic actuators at each actuating member 118'. Hydraulic actuators are generally only effective as pushing actuators, requiring the resting configuration of the apparatus 100' to be longitudinally expanded and laterally contracted. Lateral expansion at each of the actuating members 118' could then be achieved by applying pressure to each corresponding hydraulic line (which itself forms a portion of the mesh). This arrangement would also allow for mechanical coupling of the actuating members 118' to one another, and allow them to be driven by a single end-mounted motor 744' in much the same way as the cable-facilitated actuation of the embodiment shown in FIGS. 6-7. This hydraulically-actuated configuration could achieve faster waves, and therefore faster locomotion speeds than the aforementioned SMA configuration, but would require an effective micro-hydraulic piston for used as the end-mounted motor 744'.

Figure 8B:
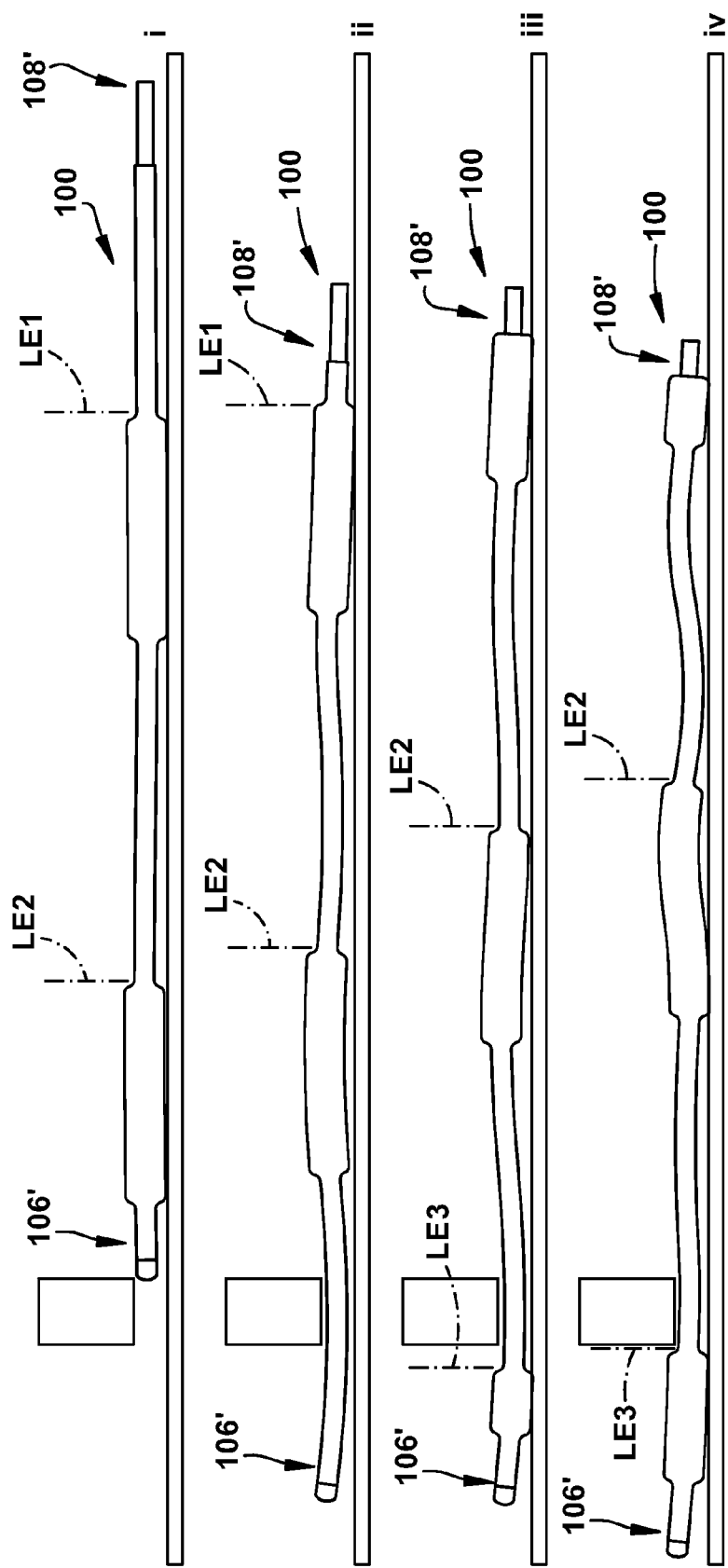
FIG. 8B illustrates a sequence of motion of the embodiment of FIG. 8A in a first use environment.

FIG. 8B depicts the way in which the bolus of fluid 846 of the second embodiment moves with respect to the apparatus 100' to propel the apparatus longitudinally forward and even through a tight crevice. In the sequence of views i through iv of FIG. 8B, the sequential peristaltic wave 322' action can be seen. The fluid 846 comprising the leading edge LE1 of the first peristaltic wave 322' travels backward (i.e., toward the right side of the page in the orientation of FIG. 8B) in views i and ii, until reaching the second body end 108', at which point the fluid 846 returns to the first body end 106' via the counterflow tube(s) 852 and begins to move as the leading edge LE3 of a third peristaltic wave 322' in views iii and iv. Concurrently, the leading edge LE2 of a second peristaltic wave 322' travels gradually backward with respect to the apparatus 100' throughout the sequence of views i-iv.

Figure 9B:
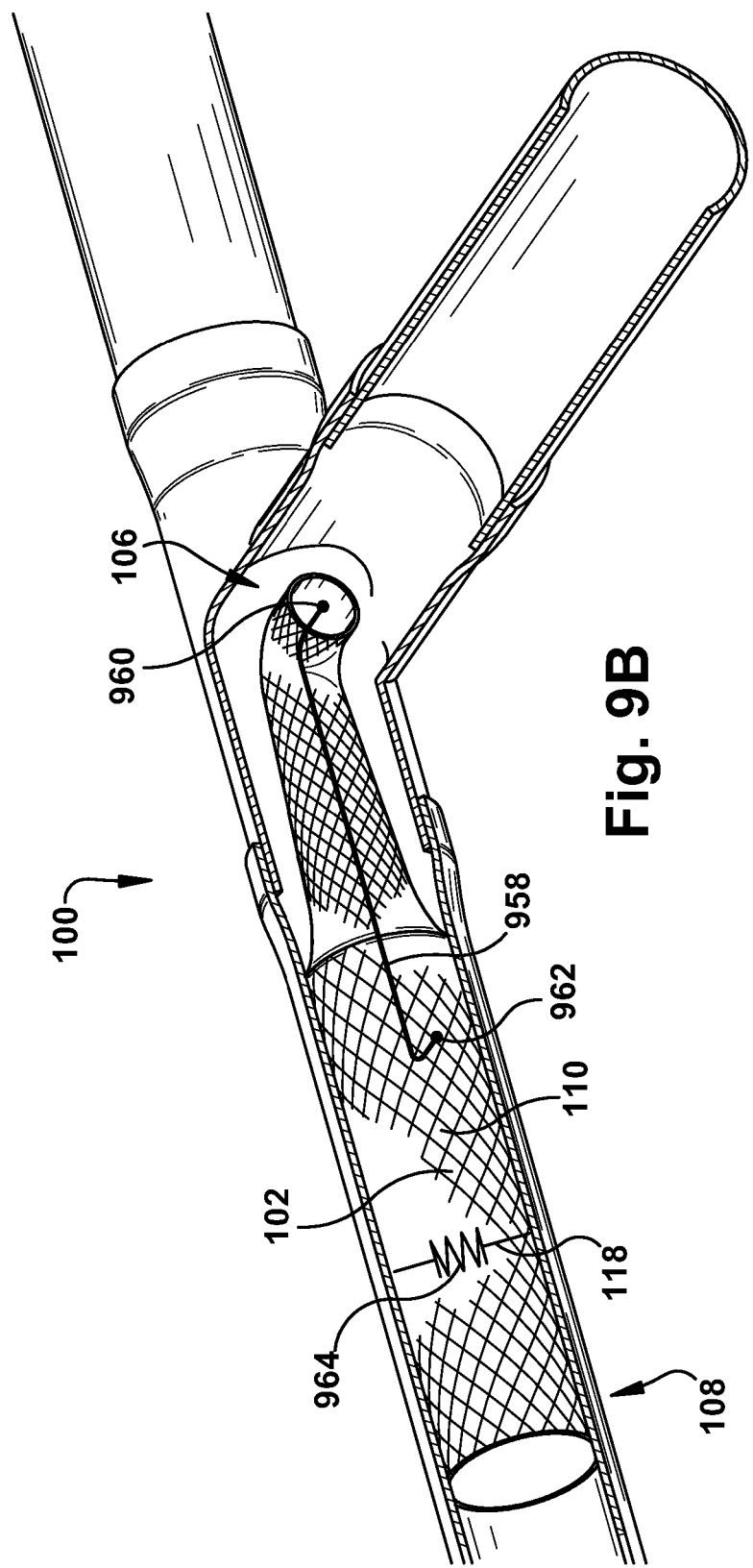

FIGS. 9A-9B depict the apparatus 100 of either of the first and second embodiments of the present invention in a cut-away arrangement in a second use environment within an ambient lumen wall 954. In FIG. 9A, the apparatus 100 is locomoting longitudinally toward the first body end 106 and is approaching a junction 956 at which the apparatus will have to turn. Accordingly, at least one steering member 958 may be provided, the steering member being operative to direct the body member 102 in a lateral plane during the longitudinally oriented locomotion. Here, the steering member 958 is a steering cord 958 extending longitudinally with respect to the body member 102. The steering cord 958 has longitudinally spaced first and second steering ends 960 and 962, respectively, with the first and second steering ends both being connected to the body member 102. Here, the first and second steering ends 960 and 962 are both connected to an inner surface of the body member 102 such that the steering cord 958 extends longitudinally within the body lumen 110. The steering cord 958 is therefore actuable to asymmetrically longitudinally contract the body member 102 to direct the body member in the lateral plane.

In the configuration of FIGS. 9A-9B, with the steering cord 958 being located inside the body lumen 110, the steering cord can be placed under longitudinally-oriented tension by any suitable means to pull the first and second steering ends 960 and 962 closer together and contract just one side of the body member 102 to cause the body member to be directed in a turn toward the side having the steering cord, as shown in FIG. 9B and similar to the way in which a rider pulls upon reins to direct a horse's travel.

However, it is also contemplated that the steering cord 958 could be an at least partially rigid structure located inside the body lumen 110, and a longitudinally compressive force could be exerted upon the body member 102 to direct the body member in a turn away from the side having the steering core. The steering cord 958 could instead be located on the outside of the body member 102, if desired. Additionally, multiple steering cords (not shown), each having any desired configuration and operating scheme, could be provided to a single apparatus 100, optionally at different locations laterally and/or longitudinally spaced from one another, to provide a wide variety of possible steering arrangements.

Another way in which the steering can be affected, and which is shown in FIG. 9B, involves at least a chosen one of the plurality of actuating members 118 which includes a directional actuator component 964 configured for tension control separate from the tension control of the remainder of the chosen actuator member. The directional actuator component 964, when present, may be actuatable to differentially tension the actuating member 118 and thereby direct the body member 102 in the lateral plane to serve as a steering member 958. For example, if the actuating member 118 extends about the body member 102 and is laterally physically divided into at least two smaller partially-extending arcs (not shown), one of the arcs could be actuated to laterally contract around the body member more than the other arc, resulting in a greater longitudinal expansion of the body member on the more-contracted side, which will cause the apparatus 100 to turn laterally away from the side with the greater longitudinal expansion. One of ordinary skill in the art can readily provide and control a suitable steering mechanism, using any or all of the above-described mechanisms or any other suitable mechanism, for a particular application of the present invention.

The second use environment, involving the apparatus 100 being enclosed within an ambient lumen wall 954, also provides an opportunity to discuss use of the apparatus within an ambient environment having the ambient lumen wall substantially surrounding the apparatus and containing longitudinally oriented fluid flow. In this situation, the power source 120 may be configured to selectively change the lateral cross-sectional area of the body member 102 at the actuation location to selectively move at least a portion of the body member 102 into and out of lateral contact with the ambient lumen wall 954. In this case, the fluid flow may interact with the body member 102 and the ambient lumen wall 954 to at least partially produce the at least one peristaltic wave 322. The manner in which this is accomplished depends upon whether the apparatus 100 is traveling downstream or upstream with respect to the longitudinally oriented fluid flow.

When the fluid flow is in a direction from the first body end 106 toward the second body end 108 (i.e., in the first fluid flow direction 966 of FIG. 9A, which shows the apparatus 100 traveling upstream), at least a portion of the body member 102 may be moved selectively into and out of lateral contact with the ambient lumen wall 954. This lateral contact between the body member 102 and the ambient lumen wall 954 acts in an alternating manner to selectively and successively direct fluid flow through the body lumen 110 and outside the body member 102 (i.e., between the apparatus 100 and the ambient lumen wall 954). Here, the interaction of the fluid flow and the body member 102 at least partially produces the at least one peristaltic wave 322. In other words, the actuating member(s) 118 quickly cycles between expanded and contracted modes to direct water alternately through and around the body lumen 110 in quick succession, and the fluid flow will help to produce the peristaltic wave 322 needed to propel the apparatus 100 upstream. In this configuration, where the external fluid flow acts upon the apparatus 100 to help propagate the peristaltic wave 322, only a single actuating member 118, located on a leading end (here, the first body end 106) of the apparatus 100, is needed to start each peristaltic wave 322.

Alternately, when the fluid flow is in a direction from the second body end 108 toward the first body end 106 (i.e., the apparatus 100 is traveling downstream, in a direction longitudinally opposite the first fluid flow direction 966 of FIG. 9A), at least a portion of the body member 102 may be moved selectively into and out of lateral contact with the ambient lumen wall 954 to selectively allow the apparatus 100 to be carried along by the fluid flow. When desired, at least a portion of the body member 102 may be moved into lateral contact with the ambient lumen wall 954 to slow down the motion of the apparatus 100 downstream via frictional contact with the ambient lumen wall. By doing so, the body member 102 closes off the fluid flow path between the body member and the ambient lumen wall 954, and the fluid flow then is encouraged to travel through the body lumen 110, pressing the body member 102 up against the ambient lumen wall 954 and further slowing longitudinal motion of the apparatus 100 due to the downstream fluid flow.

It is contemplated that a plethora of different tools and associated actuators, fungible structures, spare parts, viewing devices, and/or any other suitable cargo could be carried by an apparatus 100 which locomotes using the described peristaltic wave 322 motion, to carry out any of a wide range of desirable tasks at a remote, constrained, difficult to access, dangerous, or otherwise suitable work environment for the present invention. One of ordinary skill in the art will be able to equip the apparatus 100 to serve as a prime mover for any suitable task, and at any suitable size/scale, and to choose options for the structure of the apparatus accordingly.

While aspects of the present invention have been particularly shown and described with reference to the preferred embodiment above, it will be understood by those of ordinary skill in the art that various additional embodiments may be contemplated without departing from the spirit and scope of the present invention. For example, any of the described structures of the apparatus 100, 100' could have any suitable dimensions, flexibilities, shapes, constructions, or other properties, and could be made of any suitable material or combination of materials. The apparatus 100, 100' could, for example, have a lateral width of one centimeter or less for a medical use environment, a lateral width of twenty-five centimeters or more for an industrial use environment, or any other desired lateral widths or longitudinal lengths as desired for a particular use environment. Whereas the control structure and function for the apparatus 100, 100' are not specifically shown or disclosed herein, one of ordinary skill in the art will be able to readily provide appropriate control mechanism(s) and/or programming to control the apparatus 100, 100', including the type and configuration of actuating member(s) 118, 118' and/or power source(s) 120, 120' provided, to achieve a desired locomotion of the apparatus. The embodiments of FIGS. 1-7 and 8 could each be powered to produce the peristaltic wave 322, 322' via a mechanism including SMA, hydraulic, pneumatic, or any other desired mechanism. The active, peristaltic-wave-propagating portion of the apparatus 100 could comprise only a portion of a longer structure, such as serving as a driving portion at the front end of an elongated tube. A device or method incorporating any of these features should be understood to fall under the scope of the present invention as determined based upon the claims below and any equivalents thereof.

Other aspects, objects, and advantages of the present invention can be obtained from a study of the drawings, the disclosure, and the appended claims.

Having described the invention, we claim:

1. An apparatus for locomotion, the apparatus comprising:
an elongate body member defining a longitudinal axis and having oppositely disposed first and second body ends separated by a body lumen; and
a power source operative to selectively provide motive power to the apparatus by changing a lateral cross-sectional area of the body member in at least one actuation location to produce at least one peristaltic wave propagated through the body member substantially along the longitudinal axis; wherein
the peristaltic wave is a substantially smooth wave; and wherein
the peristaltic wave causes the body member to interact with an ambient environment and provide longitudinally oriented locomotion to the apparatus.

2. The apparatus of claim 1, wherein the power source is operative to selectively provide motive power to the apparatus by changing the lateral cross-sectional area of the body member at a plurality of longitudinally spaced actuation locations to produce the at least one peristaltic wave.

3. The apparatus of claim 2, wherein the body member includes a plurality of longitudinally spaced actuating members associated with the actuation locations, and the power source changes the lateral cross-sectional area of the body member by changing the lateral dimensions of the actuating members in a predetermined sequence.

4. The apparatus of claim 1, wherein the ambient environment includes an ambient lumen wall substantially surrounding the apparatus and containing longitudinally oriented fluid flow, the power source is configured to selectively change the lateral cross-sectional area of the body member at the actuation location to selectively move at least a portion of the body member into and out of lateral contact with the ambient lumen wall, and wherein the fluid flow interacts with the body member and the ambient lumen wall to at least partially produce the at least one peristaltic wave.

5. The apparatus of claim 4, wherein the fluid flow is in a direction from the first body end to the second body end, and at least a portion of the body member is moved selectively into and out of lateral contact with the ambient lumen wall to selectively and successively direct fluid flow through the body lumen and outside the body member, the interaction of the fluid flow and the body member at least partially producing the at least one peristaltic wave.

6. The apparatus of claim 4, wherein the fluid flow is in a direction from the second body end to the first body end, and at least a portion of the body member is moved selectively into and out of lateral contact with the ambient lumen wall to selectively allow the apparatus to be carried by the fluid flow.

7. An apparatus for locomotion, the apparatus comprising:
an elongate body member defining a longitudinal axis and having oppositely disposed first and second body ends separated by a body lumen, the body member being made of a material with anisotropic strain properties and having a plurality of longitudinally spaced actuating members associated therewith, each actuating member extending about at least a portion of the body member within a lateral plane substantially perpendicular to the longitudinal axis; and
a power source operative to selectively provide motive power to the apparatus by changing the lateral dimensions of the plurality of actuating members in a predetermined sequence to produce at least one peristaltic wave propagated through the body member substantially along the longitudinal axis; wherein
the body member is constructed to provide inversely proportional relationships between lateral contraction and longitudinal expansion and between longitudinal contraction and lateral expansion; and wherein
the peristaltic wave causes the body member to interact with an ambient environment and provide longitudinally oriented locomotion to the apparatus.

8. The apparatus of claim 7, wherein the body member is at a laterally expanded state in a resting configuration and at least one actuating member selectively laterally contracts the body member under motive power from the power source.

9. The apparatus of claim 8, wherein the laterally expanded configuration is provided by at least one of a compressible fluid and an incompressible fluid located inside the body member, and wherein the fluid assists in propagating the longitudinally-oriented peristaltic wave produced by the energization of the actuating members.

10. The apparatus of claim 9, wherein, when the laterally expanded configuration is provided by the incompressible fluid, the body member includes at least one longitudinally oriented counterflow tube to allow the incompressible fluid to travel between the first and second body ends in a direction opposite the direction in which the peristaltic wave is propagated.

11. The apparatus of claim 7, wherein the body member is at a laterally contracted state in a resting configuration and at least one actuating member selectively laterally expands the body member under motive power from the power source.

12. The apparatus of claim 7, wherein longitudinal contraction is at least partly provided to the body member by at least one elastic member extending longitudinally with respect to the body member, the elastic member having longitudinally spaced first and second elastic ends, the first and second elastic ends both being connected to the body member.

13. The apparatus of claim 7, wherein at least one of the actuating members is formed from at least one of a shape-memory alloy and a concentric cable.

14. The apparatus of claim 13, wherein the body member is at least partially formed by an active mesh, the active mesh including an actuation component operative to actuate at least one of the actuating members.

15. The apparatus of claim 7, wherein the body member is at least partially formed by a mesh including a pair of helical fibers having opposite-handed winds, the helical fibers being connected at mutual intersections to form the mesh.

16. The apparatus of claim 7, wherein the body member is at least partially formed by a braided mesh.

17. The apparatus of claim 7, wherein the body member is at least partially formed by a mesh including a plurality of overlapping fibers attached together at mutual intersections.

18. The apparatus of claim 7, including at least one steering member operative to direct the body member in a lateral plane during the longitudinally oriented locomotion.

19. The apparatus of claim 18, wherein the steering member is a steering cord extending longitudinally with respect to the body member, the steering cord having longitudinally spaced first and second steering ends, the first and second steering ends both being connected to the body member, and the steering cord being actuable to asymmetrically longitudinally contract the body member to direct the body member in the lateral plane.

20. The apparatus of claim 18, wherein at least a chosen one of the plurality of actuating members includes a directional actuator component configured for tension control separate from the tension control of the remainder of the chosen actuation member, the directional actuator component being actuatable to direct the body member in the lateral plane.

21. The apparatus of claim 7, wherein the power source includes a collective power provider, the collective power provider being operatively connected to, providing motive power to, and changing the lateral dimensions of a plurality of actuating members, the collective power provider being longitudinally spaced from at least one of the plurality of actuating members.

22. The apparatus of claim 7, wherein the power source includes at least one individual power provider, each individual power provider being operatively connected to, providing motive power to, and changing the lateral dimensions of a chosen one of the plurality of actuating members.

23. The apparatus of claim 22, wherein each individual power provider is co-located with a respective actuating member.

24. The apparatus of claim 7, wherein ambient fluid is permitted to flow through the body lumen during locomotion of the apparatus.

25. The apparatus of claim 7, including a flexible sheath surrounding at least a portion of the body member.

26. A method of locomotion, the method comprising the steps of:
providing an apparatus including an elongate body member defining a longitudinal axis and having oppositely disposed first and second body ends separated by a body lumen;
selectively providing motive power to the apparatus by changing a lateral cross-sectional area of the body member in at least one actuation location;
producing at least one peristaltic wave propagated through the body member substantially along the longitudinal axis, the peristaltic wave being a substantially smooth sinusoidal wave; and
causing the body member to interact with an ambient environment and provide longitudinally oriented locomotion to the apparatus.

27. The method of claim 26, wherein the step of selectively providing motive power to the apparatus includes the step of changing the lateral cross-sectional area of the body member at a plurality of longitudinally spaced actuation locations.

28. The method of claim 27, including the steps of:
providing a plurality of longitudinally spaced actuating members, each actuating member associated with an actuation location; and
changing the lateral cross-sectional area of the body member by changing the lateral dimensions of the actuating members in a predetermined sequence.

29. The method of claim 26, wherein the ambient environment includes an ambient lumen wall substantially surrounding the apparatus and containing longitudinally oriented fluid flow, and including the steps of:
selectively changing the lateral cross-sectional area of the body member at the actuation location to selectively move at least a portion of the body member into and out of lateral contact with the ambient lumen wall; and
at least partially producing the at least one peristaltic wave through interaction between the fluid flow and the body member.

30. The method of claim 29, wherein the fluid flow is in a direction from the first body end to the second body end, and including the steps of:
selectively moving at least a portion of the body member into and out of lateral contact with the ambient lumen wall;
selectively and successively directing fluid flow through the body lumen and outside the body member; and
at least partially producing the at least one peristaltic wave through interaction between the fluid flow and the body member.

31. The method of claim 29, wherein the fluid flow is in a direction from the second body end to the first body end, and including the steps of:
selectively moving at least a portion of the body member into and out of lateral contact with the ambient lumen wall; and
selectively allowing the apparatus to be carried by the fluid flow.

* * * * *